March 7, 1967     J. MAHLER     3,307,945
DIFFUSION TRANSFER OF DICHROIC IODINE
STAIN IN VECTOGRAPH PRODUCTION
Filed May 9, 1963
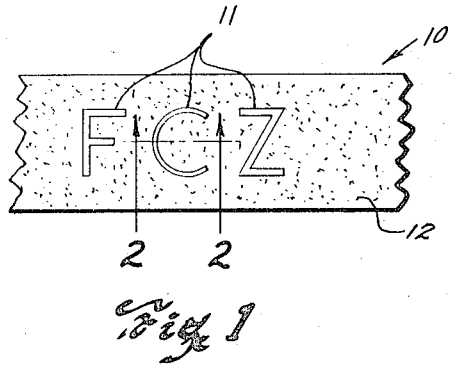
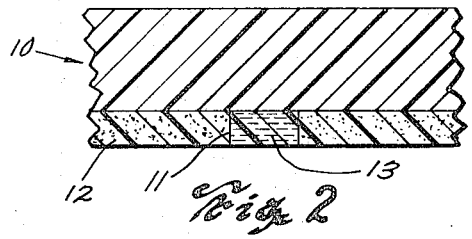
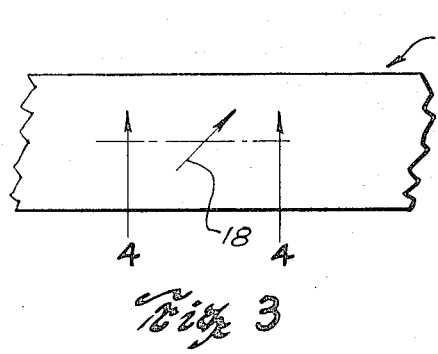
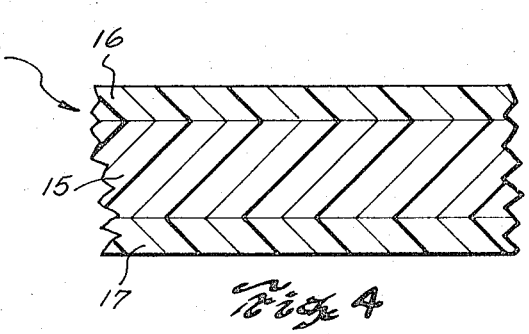
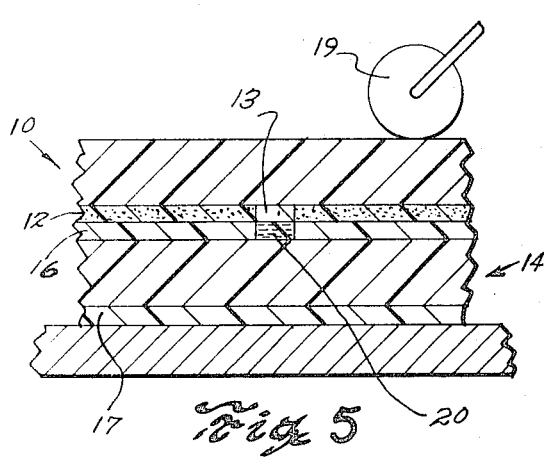
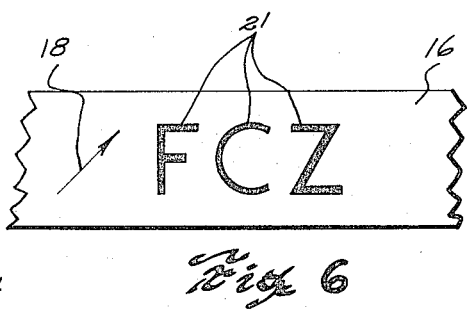
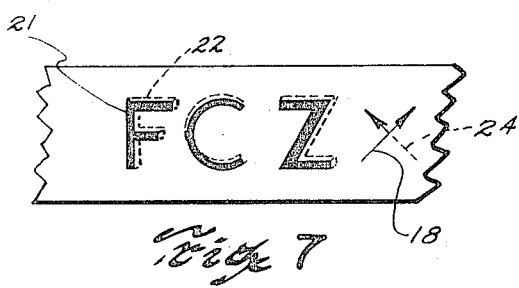
INVENTOR.
JOSEPH MAHLER
BY
ATTORNEY United States Patent Office 3,307,945
Patented Mar. 7, 1967

3,307,945
DIFFUSION TRANSFER OF DICHROIC IODINE STAIN IN VECTOGRAPH PRODUCTION
Joseph Mahler, Fiskdale, Mass., assignor to American Optical Company, Southbridge, Mass., a voluntary association of Massachusetts
Filed May 9, 1963, Ser. No. 279,213
8 Claims. (Cl. 96—29)

This invention relates to vectographs and more particularly to a novel method of producing, on a transparent vectograph film, image information such as lines, letters, drawings or the like having self-contained light-polarization.

It is to be understood that the term "vectograph," as used herein, is directed more particularly to films, projection slides, test charts or the like having, on a clear colorless background, single, double and/or stereoscopic light-polarizing image information or the reverse thereof hereinafter referred to as black and white vectographs. When stereoscopic image information is used, the images are arranged in accurately registered pairs in a conventional manner with their axes of polarization at 90° to each other so as to produce a three-dimensional effect when viewed through conventional light-polarizing analyzers.

The prime object, therefore, of the present invention is to provide a simple, novel and inexpensive method of producing black and white vectographs of the above nature.

Another object is to provide a novel method of forming black and white vectographs of the above nature wherein standard and readily available materials are used.

Another object is to provide a novel vectograph printing process wherein the required steps of the process, including preparation of chemical formulas, exposure times or the like are not critical.

Specific embodiments of the invention will now be described by way of example with reference to the accompanying drawings in which:

FIG. 1 is a fragmentary plan view of an exposed and developed conventional camera film having image information formed thereon in accordance with the invention and which will hereinafter be referred to as a master negative;

FIG. 2 is an enlarged fragmentary sectional view taken as on line 2—2 of FIG. 1;

FIG. 3 is a fragmentary plan view generally similar to FIG. 1 of a conventional vectograph film;

FIG. 4 is an enlarged fragmentary sectional view taken as on line 4—4 of FIG. 3;

FIG. 5 is a diagrammatic sectional view illustrating a step of the method of the invention;

FIG. 6 is a view similar to FIG. 1 of the end product resulting from the method of the invention; and FIG. 7 is a view generally similar to FIG. 6 of an end product resulting from a modification of the invention.

Referring more particularly to the drawings wherein like characters of reference designate like parts throughout the several views, there is shown in FIG. 1 what will be referred to hereinafter as a conventional photographic master member 10. This master member may be a negative film of a conventionally known type embodying an emulsion containing uniformly distributed silver halides which is first exposed to form characters of the desired related shapes and sizes and which is thereafter developed in a conventional manner so as to produce a negative having transparent image information 11 thereon surrounded by a dark background 12 of reduced metallic silver. A film of this nature which has produced excellent results is sold commercially under the trade name "Kodalith" by the Eastman Kodak Company, Rochester, New York.

The photographic master member, instead of being the negative film type, may be a positive formed from said negative film in which instance the image information 11 will embody reduced metallic silver and will be surrounded by a clear, transparent, isotropic background 12 or may be a conventional photographic print type produced by said negative all of which will be referred to hereinafter as a photographic master, the important factor being that either the image information or the background must contain reduced metallic silver.

In carrying out the method of the invention, the photographic master member having the desired image information thereon is first placed in plain water for at least two minutes to soften the same. The photographic master member is then imbibed in a staining solution comprising 100 ccs. water and 5 to 10 ccs. of a stock solution consisting of 100 ccs. water, 30 to 50 grams potassium iodide and from 5 to 10 grams iodine crystals. The preferred time interval of staining is from 10 to 60 seconds so as to stain the portions of said photographic master member throughout the areas thereof which are free from said reduced metallic silver, as diagrammatically illustrated by the dash lines 13 in FIG. 2. The portions of the master member, which contain the reduced metallic silver, such as 12 in FIG. 2, will be prevented from being stained by said reduced metallic silver during said period of imbibition. This, of course, is the case when the photographic master member is of the negative type having clear image information 11 thereon as shown in FIG. 1. In instances when the photographic master member is of a positive nature, the background which is clear and isotropic will absorb and contain the stain and the image information which, in this instance, contains the reduced metallic silver will be free from said stain.

The photographic master member, following the staining of the areas thereof which are free from said reduced metallic silver, is placed in superimposed relation with a standard commercially available vectograph film 14 such as shown in FIGS. 3, 4, and 5, which comprises an intermediate supporting sheet of transparent plastic material such as cellulose acetate butyrate 15 having laminated on the opposite sides thereof layers 16 and 17 of water-absorptive material such as polyvinyl alcohol whose molecules have been oriented in a given direction by stretching said layers or by the use of any other known means. The direction of orientation of the molecules of the layer 16 which, in this instance, is engaged by the metallic silver containing side of the photographic master member 10 is indicated by the arrows 18 in FIGS. 3 and 6.

In further carrying out the method of the invention, the photographic master member 10, as shown in FIG. 5, subsequent to the staining and the placing thereof in superimposed relation with the layer 16 of the vectograph film member 14 is forced under pressure into intimate contact with said film by the use of a rubber roller 19 or the like for a time interval of approximately two minutes or for a period sufficient to permit the stain within the image information area 13 to be transferred and absorbed into the layer of water-absorptive material or polyvinyl alcohol 16 throughout the area of the image information 13, as shown at 20. This, therefore, causes the image information to be printed into the layer 16 only throughout the areas of the image information or configurations. The layer of reduced metallic silver which functions to prevent any staining to take place causes the staining to take place only within the confines of the image information or configuration. Should any stain be present, such as a slight amount which might be retained on the surface of the reduced metallic silver portion of the photographic master member following the imbibing thereof in said staining solution, the reduced metallic silver will function as a bleaching agent to eliminate the stain when placed and forced into intimate superimposed relation with the vectograph film 14.

The stain which is transferred from the area 13 to the area 20 by the printing process, as specified above, is adapted to cause the oriented molecules within the area 20 to be rendered dichroic and light-polarizing.

Subsequent to said staining, the photographic master member 10 is removed from the vectograph film 14 and the said film 14 is thereafter subjected to a fixing solution consisting of approximately 5 grams boric acid, 0.5 to 1 gram potassium iodide, and 0.1 to 0.5 gram borax in 100 ccs. water to stabilize the same.

The axis of polarization of the molecules within the resultant images 21, as shown in FIG. 6, is illustrated by the arrow 18. It is to be understood that the area surrounding the image information or configurations 21 is clear, transparent and isotropic in nature and is referred to herein as the background means surrounding the image information means 21.

It is pointed out that while the image information is indicated as being formed with solid uniform density as results from the staining, they may be formed so as to have the appearance of images produced by a known so-called "half-tone" printing technique.

While the above printing method has been described as being carried out by the use of a so-called master negative film, it is to be understood that the same steps of the method may be employed with a positive or conventional photographic print having portions of the areas thereof of reduced metallic silver and other portions thereof free from said reduced metallic silver. However, the end product will be the reverse of that shown in FIGS. 6 and 7. The steps of the method will be the same with the exception that the master negative film 10 will be replaced by a photographic master print or master positive film. The end products which are referred to herein as being films, projection slides, test charts or the like may embody single, double and/or stereoscopic image configurations surrounded by a background, with either said image configurations or said background being light-polarizing as results from the type of photographic master member employed.

When it is desired to produce double images, that is, images in both the layers 16 and 17, the images are produced by two separate printings which embody the same method with the exception that different image information or configurations are used. Otherwise, the printing of the second side 17 is identical to that of the first side 16. It is pointed out, however, that the axis of orientation of the molecules of the layer 17 will be at 90° to the axis of orientation of the first layer 16. The axes of polarization of the image configurations or background areas surrounding said image configurations, depending upon whether or not a positive or negative master photographic member is employed, as specified above, will be at 90° to each other as a result of the staining of the respective molecules within said areas as the case may be. By reason of the fact that the axes of polarization of the stained molecules are at 90° relative to each other, the image information or configurations on the opposite sides of the vectograph film may be rendered separately visible to the respective eyes of an individual by viewing the same through known conventional light-polarizing analyzers. This is due to the fact that such analyzers have their axes of polarization at 90° to each other similar to the axes of polarization of the respective image information or configurations or background areas, as the case may be.

If a three-dimensional effect is desired, similarly formed image information 21 and 22 may be produced on the respective opposite sides of the vectograph film, as shown in full and dash lines in FIG. 7. In this instance, the image information or configurations are arranged in accurately registered pairs, one on each side of the vectograph film 14, and with the axis of polarization of the image information or configurations 21 being disposed in the direction illustrated by the arrow 18 and the axis of the polarization of the other of said image information or configurations being disposed in a direction indicated by the arrow 24. Here again, the end product is viewed through conventional light-polarizing analyzers, such as described above, wherein the respective image information or configurations will be visible only to the respective eyes of the individual viewing the same but will further have a three-dimensional appearance.

In instances when the background of the end product is stained and is light-polarizing and the image information or configurations are clear and isotropic, the analyzers, as defined above, will neutralize the backgrounds instead of the image information or configurations and will cause the said backgrounds to blend with said image information or configurations and will cause them to be invisible to the respective eyes of the observer.

From the foregoing, it will be seen that a simple, efficient and economical method of forming printed vectographs has been provided. However, it is to be understood that many changes may be made in the steps of the method and chemical compositions used without departing from the spirit of the invention as expressed in the accompanying claims and the invention, therefore, is not to be limited to the exact matters shown and described as the preferred matters have been given only by way of illustration.

Having described my invention, I claim:

1. The method of transferring image information onto a transparent vectograph film member from a conventional photographic master member including a backing support having on one side thereof a continuous layer of water absorptive material containing fully developed image means and background means, one of said means embodying reduced metallic silver and the other of said means being free from said reduced metallic silver, said vectograph film member embodying a support of transparent material having a continuous layer of water-absorptive material laminated to at least one side thereof with its molecules oriented in a given direction; said method comprising the steps of applying to at least one of said layers an aqueous staining solution containing a dichroic iodine stain capable of being bleached by reduced metallic silver, placing said members in intimate superimposed relationship with said water absorptive layers in direct contact with each other and retaining the same in said relationship for a time interval sufficient to cause said dichroic iodine stain in said staining solution to render said molecularly oriented material of said film light polarizing substantially only where contacted by the area of said photographic master member which is free of said reduced metallic silver, said reduced metallic silver in said master member eliminating by bleaching the presence of dichroism of said stain in said film member throughout areas where said metallic silver contacts said film member, separating said photographic master member and film member and subjecting said film member to a fixing solution to stabilize the same.

2. The method as recited in claim 1 wherein said aqueous staining solution comprises the equivalent of 100 ccs. water and from 5 to 10 ccs. of a stock solution consisting of 100 ccs. water, 30 to 50 grams potassium iodide and 5 to 10 grams iodine crystals.

3. The method as recited in claim 1 wherein said one of said members is subjected to said application of said staining solution for a period of from 10 to 60 seconds.

4. The method as recited in claim 1 wherein at least one of said members is placed in water and removed therefrom at one stage of said method prior to said step of placing said members in superimposed relationship.

5. The method as recited in claim 1 wherein said layer of water-absorptive material on said film member is polyvinyl alcohol.

6. The method as recited in claim 1 wherein said aqueous staining solution is applied to said one side of said photographic master member.

7. The method as recited in claim 6 wherein said photographic master member is placed in water for a minimum period of two minutes prior to said application of said staining solution thereto.

8. The method as recited in claim 1 wherein said vectograph film member has a layer of said molecularly oriented water-absorptive material laminated to each of its opposite sides and said steps of said method are applied to both of said sides of said film member.

References Cited by the Examiner

UNITED STATES PATENTS

| 2,299,906 | 10/1942 | Land | 96—35 |
| 2,315,370 | 3/1943 | Land. | |
| 2,346,775 | 5/1944 | Mahler | 101—149.1 |
| 2,409,959 | 10/1946 | Ryan et al. | 96—29 |
| 2,445,581 | 7/1948 | Land | 96—29 |
| 2,983,606 | 5/1961 | Rogers | 96—29 |
| 2,997,390 | 8/1961 | Land | 96—29 |

OTHER REFERENCES

Mees: The Theory of the Photographic Process, pp. 576–578 pub. 1942 by Macmillan Co., New York, N.Y.

Judge: Stereoscopic Photography, pp. 307–310 pub. by Chapman and Hall, 1950 London, England.

Friedman: History of Color Photography, 1944, 430–434 pub. 1944, The Amer. Phot. Pub. Co., Boston, Mass.

NORMAN G. TORCHIN, *Primary Examiner.*

DONALD LEVY, *Examiner.*